(12) United States Patent
Watanabe et al.

(10) Patent No.: US 8,379,346 B1
(45) Date of Patent: Feb. 19, 2013

(54) METHOD OF FORMING METAL TO A CONCAVE PORTION OF A SUBSTRATE, METHOD OF MANUFACTURING A MAGNETIC HEAD AND A MAGNETIC HEAD

(75) Inventors: Hisayoshi Watanabe, Tokyo (JP); Yuji Matsuura, Tokyo (JP); Takayuki Nishizawa, Tokyo (JP); Masashi Sano, Tokyo (JP); Tetsuji Hori, Tokyo (JP)

(73) Assignee: TDK Corporation, Tokyo (JP)

( * ) Notice: Subject to any disclaimer, the term of this patent is extended or adjusted under 35 U.S.C. 154(b) by 31 days.

(21) Appl. No.: 13/194,789

(22) Filed: Jul. 29, 2011

(51) Int. Cl.
*G11B 5/31* (2006.01)
(52) U.S. Cl. .................................. 360/123.05
(58) Field of Classification Search .............. 360/123.05
See application file for complete search history.

(56) References Cited

U.S. PATENT DOCUMENTS

| | | | | |
|---|---|---|---|---|
| 7,796,359 | B2 * | 9/2010 | Otani et al. | 360/125.01 |
| 7,950,135 | B2 * | 5/2011 | Kagami et al. | 29/603.11 |
| 8,064,161 | B2 * | 11/2011 | Kudo et al. | 360/125.02 |
| 8,102,623 | B2 * | 1/2012 | Anagawa et al. | 360/125.3 |
| 8,179,636 | B1 * | 5/2012 | Bai et al. | 360/125.17 |
| 2010/0254042 | A1 * | 10/2010 | Contreras et al. | 360/123.05 |

FOREIGN PATENT DOCUMENTS

JP   A-05-290325   11/1993

\* cited by examiner

*Primary Examiner* — Mark Blouin
(74) *Attorney, Agent, or Firm* — Posz Law Group, PLC

(57) ABSTRACT

The present invention relates to a method of forming a metal in a concave portion of a substrate. The method includes a step of preparing a substrate having a concave portion; a step of applying a liquid coating member on the substrate and filling in and solidifying the concave portion with the coating member; a step of covering the coating member with a resist; a step of forming a penetrating hole that penetrates the resist in a position of the concave portion of the substrate; a step of removing the coating member within the concave portion; and a step of filling a metal into a portion where the coating member has been removed.

19 Claims, 13 Drawing Sheets ained at the edge part of the formed metal 302.
METHOD OF FORMING METAL TO A CONCAVE PORTION OF A SUBSTRATE, METHOD OF MANUFACTURING A MAGNETIC HEAD AND A MAGNETIC HEAD

BACKGROUND OF THE INVENTION

1. Field of the Invention

The present invention relates to a method of forming a metal in a concave portion of a substrate, to a method of manufacturing a magnetic head that uses the method thereof, and to the magnetic head.

2. Description of the Related Art

A micro device such as a thin film magnetic head is manufactured by depositing a variety of films on a substrate by a sputtering, a plating method, or the like. JP Laid-Open Patent Application No. 05-290325 discloses a thin film magnetic head and a method of manufacturing thereof. The thin film magnetic head has a surface (air bearing surface) opposing a recording medium and generates a writing magnetic field from the air bearing surface.

The thin film magnetic head has a main pole part and an auxiliary pole part facing the air bearing surface. A coil layer is wound in the vicinity of the main pole part at a position separated from the air bearing surface that opposes the recording medium. A magnetic flux generated by the coil layer is guided inward of the main pole part and extends from the air bearing surface to the recording medium. The auxiliary pole part is a magnetic layer that magnetically couples with the main pole part at a position separated from the air bearing surface. The auxiliary pole part is separated from the main pole part as sandwiching an insulating layer on the air bearing surface. The auxiliary pole part refluxes the magnetic flux discharged from the main pole part via the recording medium.

When manufacturing the thin film magnetic head described above, or other micro devices, a step to form a metal in a concave portion on a substrate may be performed. An example of a method of forming a metal in a concave portion of a substrate by the plating method will be described with reference to FIG. 1A through FIG. 1D. In addition, FIG. 1A through FIG. 1D are drawings prepared by the applicants of the present application to describe a problem of the present invention.

FIG. 1A illustrates a substrate 300 where a concave portion 310 is formed on a surface. Normally, in order to form a metal only in the concave portion 310 on the substrate 300, as shown in FIG. 1B, a resist 301 of a predetermined pattern is formed on the substrate 300 using a photolithography method. Here, the resist 301 has an aperture in the position of the concave portion 310 of the substrate 300.

Next, a metal 302 is formed in the concave portion 310 of the substrate through the aperture of the resist 301, and then the resist 301 is removed (see FIG. 1C). The metal 302 can be formed by a plating method. The metal 302 gradually increases in thickness from the surface of the substrate 300 as the deposition time of plating proceeds. Accordingly, when attempting to form the metal 302 with a sufficient thickness in the center of the concave portion 310, the metal 302 highly builds up near the side surface of the resist 301. As a result, a large height difference 311 occurs at the edge part of the formed metal 302.

Particularly, when the concave portion 310 is deep, for example, having a depth of 3 µm or more, it is necessary to deposit the metal 302 with a thickness that is equal to or greater than the depth of the concave portion in order to form the metal 302 with a sufficient thickness even in the center of the concave portion 310. Therefore, the large height difference 311 is formed at the edge part of the formed metal 302.

As illustrated in FIG. 1D, when an insulating layer 303 is formed, for example, by sputtering in the periphery of such height difference 311, problems such as a crack 305, void 306, heterogenous phase 307, or the like, may occur in the insulating layer 303. The heterogenous phase 307 is a boundary between the insulating layer 303 grown from the surface of the substrate 300 and the insulating layer 303 grown from the height difference 311 of the metal, and an intensity of the insulating layer 303 weakens at the boundary. Therefore, the height difference 311 of the metal 302 is preferably as small as possible.

When the metal 302 is planarized, for example, by a chemical mechanical polish (CMP) before forming the insulating layer 303, this can suppress the occurrence of a crack, void, heterogenous phase, or the like in the insulating layer 303. However, there is a risk of damaging the surface of the metal 302 or structural objects formed in the substrate 300 by the CMP. Particularly, since micro devices such as the thin film magnetic head have minute structural objects formed in the substrate, it is preferred to reduce the damage caused by the CMP.

Therefore, a method is desired of forming a metal with the flat surface to the extent possible and with a low height difference in the concave portion of the substrate without conducting the CMP. Such method can be preferably utilized to manufacture, particularly, a micro device such as the thin film magnetic head.

SUMMARY OF THE INVENTION

The present invention relates to a method of forming a metal in a concave portion of a substrate. This method includes a step of preparing the substrate having the concave portion, a step of applying a liquid coating member on the substrate and filling in and solidifying the concave portion with the coating member, a step of covering the coating member with a resist, a step of forming a penetrating hole that penetrates the resist in a position of the concave portion of the substrate, a step of removing the coating member within the concave portion, and a step of filling a metal into a portion where the coating member has been removed.

The coating member is a liquid at the time of application, so the surface is mostly flat, the concave portion is sufficiently filled in, and the film thickness around the concave portion becomes small. By removing the coating member within the concave portion, an open space (mold) of a predetermined shape to be filled with a metal is formed. By forming the metal in this open space, a metal portion can be formed where the surface is mostly flat and the height difference of its edge part is small.

The method of manufacturing a magnetic head of the present invention includes: a step of preparing a multilayer film having a main pole part that has a ferromagnetic layer that faces an air bearing surface opposing the recording medium and that extends away from the air bearing surface, a coil part provided above the main pole part, and a coil insulating layer that covers the coil part and that has an aperture in the center of the coil part; a step of forming a first plated part, on the coil insulating layer, having a concave portion in the position of the aperture formed along the coil insulating layer; a step of solidifying the concave portion by filling in with a liquid coating member by applying the liquid coating member on the first plated part; a step of covering the coating member with a resist; a step of forming a penetrating hole that penetrates the resist in the position of the concave portion of the first plated part; a step of removing the coating member within the concave portion; and a step of forming a second plated part by filling metal in the portion where the coating member was removed.

According to the method of manufacturing the magnetic head described above, there is an advantage that the upper surface of the auxiliary pole layer can be mostly flattened without performing a polishing process. Because a CMP process is not necessary, the risk of damaging the main pole layer, coil part, or the like is reduced.

In addition, magnetic heads manufactured by the manufacturing method described above are also included within the scope of the present invention. The description given above of the present invention as well as other objects, features, and advantages will become apparent from the following descriptions with reference to the attached drawings exemplifying the present invention.

DETAILED DESCRIPTION OF THE INVENTION

A method of the present invention relates to a method of forming a metal in a concave portion of a substrate. Hereinafter, a description will be given regarding the present invention by exemplifying a method of manufacturing a magnetic head that relates to one embodiment. In the following embodiment, a description will be given regarding the magnetic head of a perpendicular magnetic recording system; however, the present invention is not limited thereto. The method of the present invention is not only for the magnetic head, but can be also applied to a general manufacturing method of a micro device having steps to form a metal in a concave portion. In addition, the magnetic head manufactured by the above-described method is also included within the scope of the present invention.

Figure 1A:
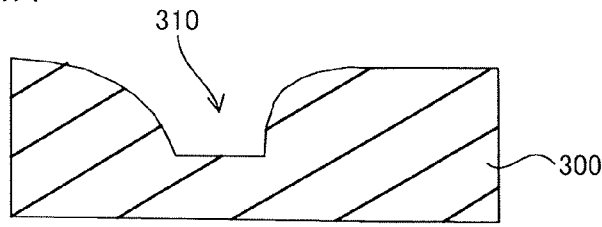
FIGS. 1A through 1D are schematic cross-sectional views describing a method that relates to prior art for forming a metal in a concave portion of a substrate.
Figure 1B:
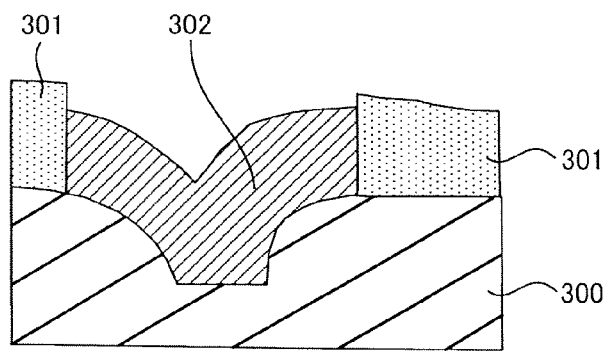
Figure 1C:
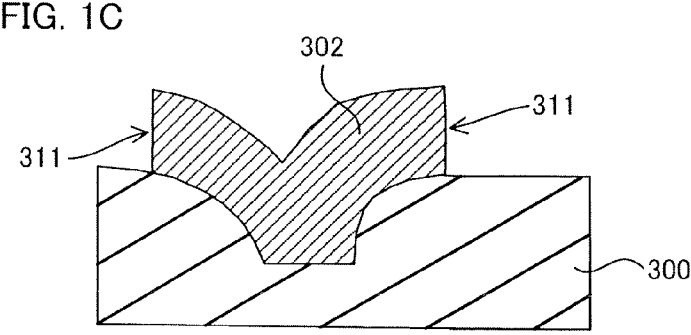
Figure 1D:
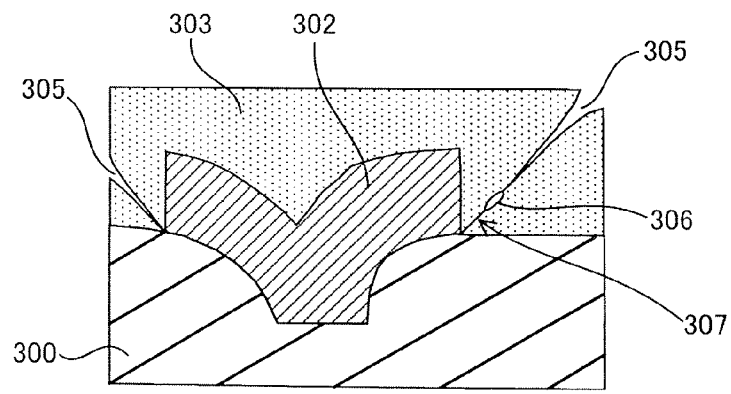
Figure 2:
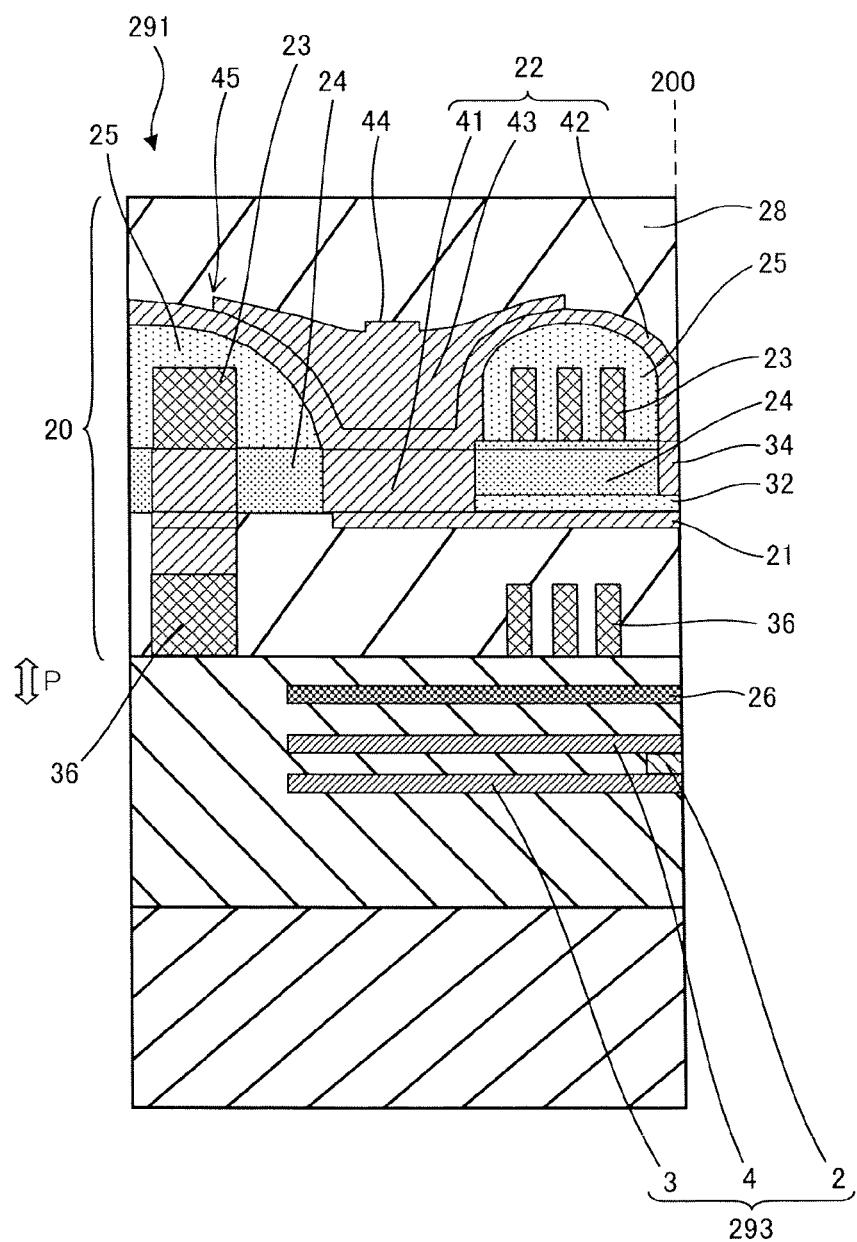
FIG. 2 is a schematic cross-sectional view of a magnetic head cut along a surface orthogonal to an air bearing surface.
Figure 3:
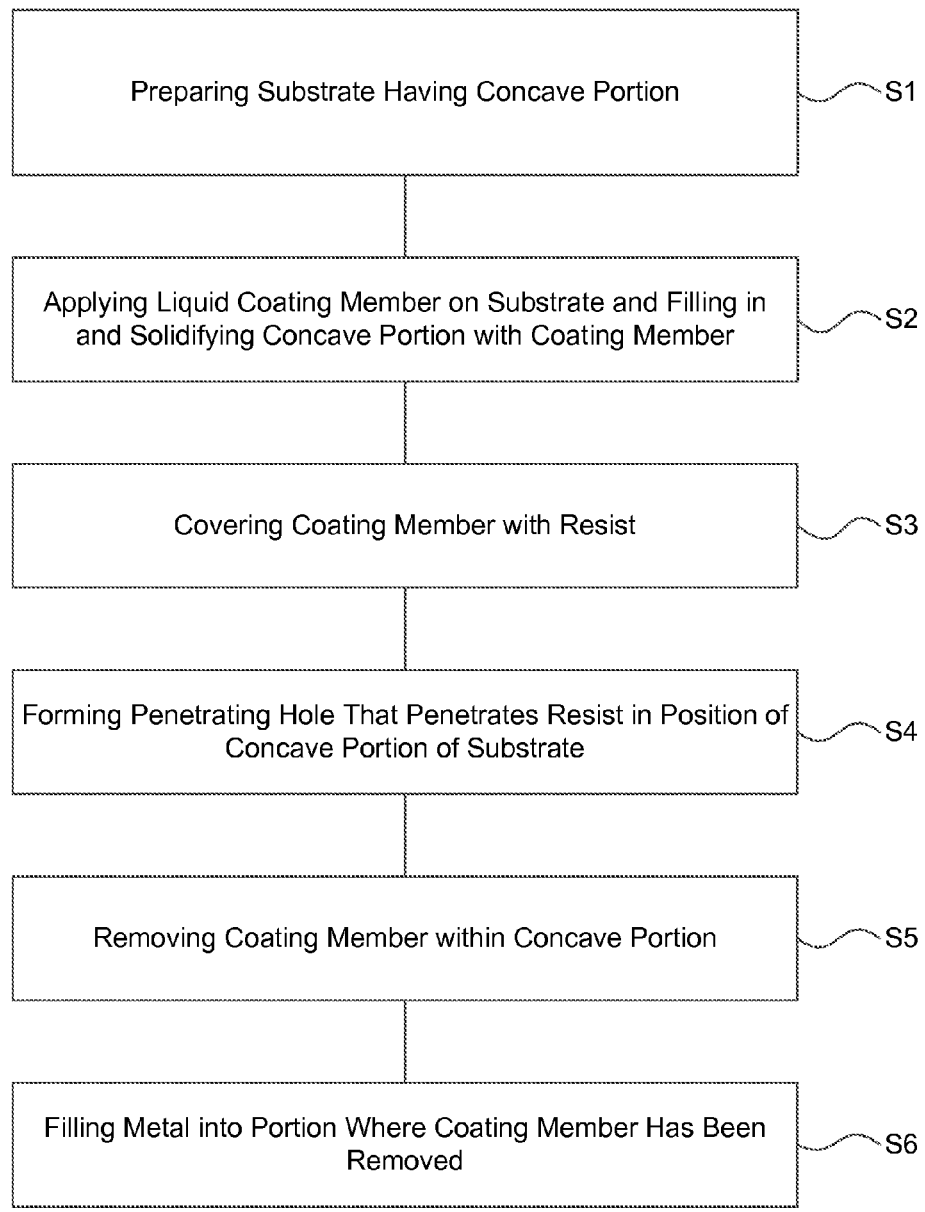
FIG. 3 is a flow diagram of a method that relates to a first embodiment.

First, a description will be given regarding a configuration of the magnetic head that is manufactured by the method of the present invention. FIG. 2 is a schematic cross-sectional view of a magnetic head 291 cut along a surface that is orthogonal to an air bearing surface. Here, the air bearing surface is one surface of the magnetic head 291 that opposes a recording medium 262 when reading a signal of the recording medium 262. Note, a configuration of a portion of the magnetic head on a side far from the air bearing surface is omitted in FIG. 2.

The magnetic head 291 has a writing element 20 to write magnetic information to the recording medium and a reading element 293 to read the magnetic information that was written to the recording medium 262. Alternatively, the magnetic head 291 may have only the writing element 20.

The reading element 293 has a MR (magnetoresistive) element 2, and lower and upper shield layers 3 and 4 that are provided so as to sandwich the MR element 2 in a film surface orthogonal direction P of the MR element 2. The MR element 2 is an element that exhibits a magnetoresistive effect and may be configured with any film configuration. For example, the MR element 2 can be a spin-valve type element.

The writing element 20 is provided above the upper shield layer 4 in the laminating direction P with an interelement shield layer 26 therebetween that is formed by a sputtering method. The writing element 20 has a configuration for so-called perpendicular magnetic recording. The pole for generating a magnetic field has a main pole part 21 and an auxiliary pole part 22. These pole parts 21 and 22 are formed by, for example, a frame plating method. The main pole part 21 is formed by a ferromagnetic layer such as, for example, FeCo. The main pole part 21 is exposed to the air bearing surface 200 and extends in a nearly orthogonal direction to the air bearing surface 200.

An insulating layer 24 is provided above the main pole part 21. A coil part 23 is provided above the insulating layer 24. The coil part 23 is formed by, for example, a frame plating method. The coil part 23 is covered by a coil insulating layer 25. The coil insulating layer 25 has an aperture in the center of the coil part 23. The coil insulating layer 25 can be formed by a resin with insulating properties. When forming a coil insulating layer by heating and solidifying a liquid resin, the coil insulating layer, due to surface tension, becomes a nearly semicircular shape from a perspective of the center of the coil part 23 in the radiation direction. Further, another coil part 36 is provided below the mail pole part 21. This coil part 36 is provided as necessary.

The auxiliary pole part 22 is a magnetic layer that is magnetically coupled with the main pole part 21. The auxiliary pole part 22 faces the air bearing surface 200 and extends farther from the air bearing surface 200 on the coil insulating layer 25. The auxiliary pole part 22 is formed from a metal such as Ni, Fe, Co, or the like or from an alloy of these metals. The auxiliary pole part 22 is linked with the main pole part 21 through an aperture in the center of the coil part 23.

The auxiliary pole part 22 has a core 41, a first plated part 42, and a second plated part 43. The core 41 is provided in the center position of the coil part and contacts the main pole part 21. The first plated part 42 is formed along the coil insulating layer 25 and has a concave portion in the position of the aperture of the coil insulating layer 25. The first plated part is preferably a ferromagnetic layer with a film thickness of approximately between 0.01 and 0.5 μm. The second plated part 43 is formed in the concave portion of the first plated part, and the upper surface of the auxiliary pole part 22 is mostly flat.

In order to improve the high-frequency characteristics of the thin film magnetic head, the thicknesses of magnetic materials 41, 42, and 43 that penetrate the center of the coil part 23 are preferably thick. In the present embodiment, the thickness of the portion of the auxiliary pole part 22 that penetrates the center of the coil part 23 is made larger by forming the second plated part 43 on the first plated part 42.

The example illustrated in FIG. 2 has a minute convex portion 44 with a smaller diameter than that of the concave portion in the position of the concave portion of the second plated part 43. Further, a minute height difference 45 is formed at an edge of the second plated part 43. The minute convex portion 44 and minute height difference 45 are described below.

A trailing shield layer 34 is provided in the tip end of the auxiliary pole part 22 on the air bearing surface 200 side. The trailing shield layer 34 is arranged at the trailing side of the main pole part 21 with a gap film 32 therebetween. The trailing shield layer 34 is configured with a ferromagnetic layer and has a function to either increase the magnetic field gradient for recording or to narrow the recording width by taking in a magnetic flux that spreads from the main pole part 21.

The gap film 32 is provided between the trailing shield layer 34 and the main pole part 21. The gap film 32 is configured from a non-magnetic material such as, for example, alumina, ruthenium, or the like.

A magnetic flux is led to the main pole part 21 and the auxiliary pole part 22 by the coil part 23. This magnetic flux is guided inward of the main pole part 21 and extended to the recording medium from the air bearing surface 200. The auxiliary pole part 22 and the trailing shield layer 34 make the magnetic flux that is discharged from the main pole part 21 to reflux via the recording medium.

A description will be given hereinafter regarding a manufacturing method of the magnetic head 291 described above. The magnetic head 291 is manufactured by forming the writing element 20 above a reading element 293 with the interelement shield 26 therebetween. In addition, respective layers and respective films are formed using an appropriate technology arbitrarily selected from film formation technology such as a plating method, sputtering method, or the like, patterning technology such as a photolithography method, etching technology, chemical mechanical polish (CMP) method, or the like.

In the present embodiment, the reading element 293 and writing element 291 are preferably formed on a wafer (see also FIG. 11) from which a large number of magnetic heads are manufactured. In this case, after forming the elements 291 and 293, the wafer is cut along the surface that is to be the air bearing surface 200, and the surface 200 is polished to manufacture a magnetic head.

To form the reading element 293, the lower shield layer 3 is first formed above the insulating layer. Subsequently, the MR element 2 is formed above the lower shield layer 3. Then, the upper shield layer 4 is formed above the MR element 2. After that, the interelement shield layer 26 is formed by a sputtering method or the like above the upper shield layer 4, and the writing element 20 is formed thereabove.

Specifically, an insulating layer is formed on the interelement shield layer 26 and the main pole part 21 is formed above the insulating layer. Before forming the main pole part 21, another configuration element such as the coil part 36 or the like may be formed as necessary. The main pole part 21 is formed in a predetermined shape using a resist as a mask where an aperture part in a predetermined pattern is formed by, for example, the photolithography. The main pole part 21 can be formed by, for example, a plating method. Following that, the resist is dissolved by an organic solvent such as acetone, for example, to remove the resist.

Figure 4A:
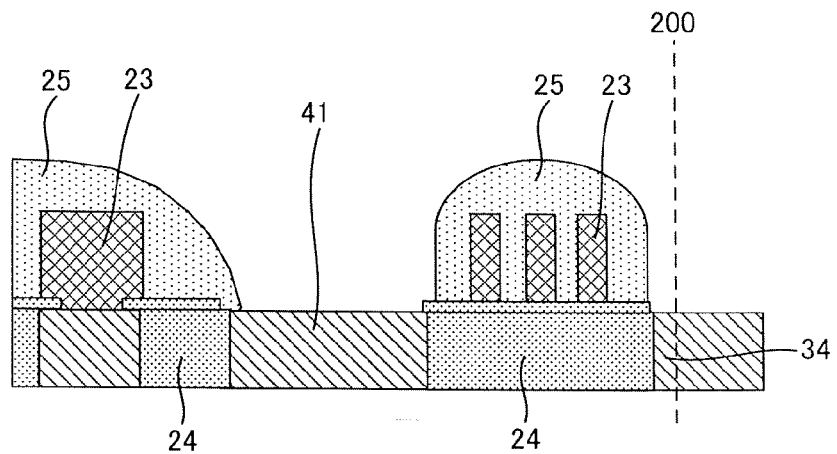
FIGS. 4A through 4C are process drawings describing the method that relates to the first embodiment of the present invention.

Next, the gap film 32 configured with a non-magnetic body is formed so as to cover the main pole part 21. The trailing shield layer 34, insulating layer 24, coil part 23, coil insulating layer 25, and the like are formed thereafter. Accordingly, as illustrated in FIG. 4A, a lamination film can be formed that includes the main pole part extended farther from the air bearing surface 200, the coil part 23 provided above the main pole part, and the coil insulating layer 25 that has the aperture in the center of the coil part 23 and covers the coil part 23. The process up to this point can be performed by any conventional technology. For convenience, FIG. 4A does not illustrate layers positioned under the insulating layer 24 and trailing shield layer 34. This is also the same for the drawings given hereinafter.

Figure 4B:
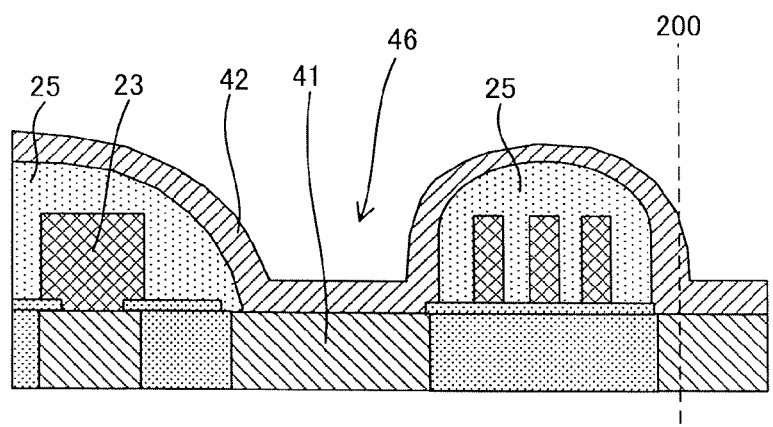
Figure 4C:
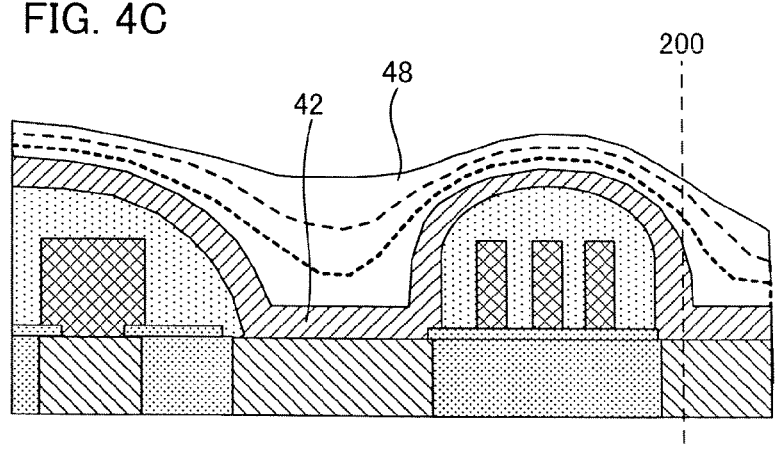

Next, as illustrated in FIG. 4B, the first plated part 42 is formed having a concave portion 46 in an aperture position of the coil insulating layer along the coil insulating layer 25 on the coil insulating layer 25. The first plated part 42 configures a portion of an auxiliary pole part 22. At this step, a lamination film having the concave portion 46 on the surface is obtained as illustrated in FIG. 4B.

In the step thereafter, a method of forming a metal in the concave portion of the substrate, which is a characteristic method of the present invention, is performed. A description is given hereinafter regarding a method of forming a metal in the concave portion with reference to the flow diagram illustrated in FIG. 3, FIG. 4C, FIGS. 5A through 5C, and FIGS. 6A through 6C. In the following description, a lamination film illustrated in FIGS. 4A and 4B may be referred to as a substrate for convenience. When the method of the present invention is applied to a micro device other than the thin film magnetic head of the present embodiment, the substrate may have any configuration. The substrate should be suitable with a concave portion where metal should be formed.

First, a lamination film having the concave portion 46 on the surface, in other words the substrate, is prepared as illustrated in FIG. 4B (Si). Next, a liquid coating member 48 is applied on the substrate and the concave portion 46 is filled with the coating member 48 (S2). The coating member 48 is a liquid form at the time of application, and therefore, the surface of the coating member 48 becomes mostly flat and the thickness of the coating member 48 on the surface of the substrate in the vicinity of the concave portion 46 becomes thin. In the present embodiment, the depth of the concave portion 46 formed on the substrate was approximately 3.0 μm.

The coating member 48 can be a viscous liquid, and is preferably applied on the substrate by spin coating. After the coating member 48 is applied, the coating member 48 is heated as necessary to solidify the coating member 48. The coating member 48 is preferably coated on the substrate divided into several times so that the concave portion 46 is filled for certain. In the present embodiment, the coating member 48 was applied on the substrate in three separated times. For convenience, dotted lines illustrated in FIG. 4C indicate lines that correspond to coating member 48 surfaces applied the first and second times.

The material for the coating member 48 is preferably a viscous liquid that can be applied by spin coating and is also soluble in an alkaline solution. As such materials, a polymer with a quick etching rate such as a polymethylglutarimide (PMGI), polymer metal alkoxide resin, polyhydroxystyrene (PHS), or the like can be used.

Figure 5A:
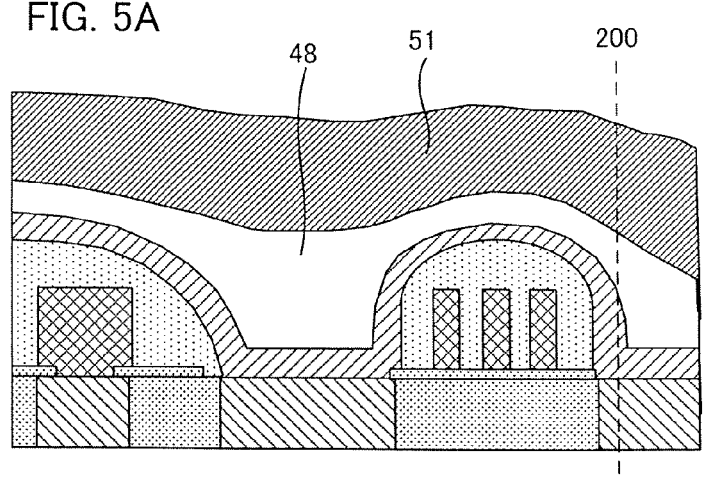
FIGS. 5A through 5C are process drawings illustrating processes that follow FIG. 4C.

Next, as illustrated in FIG. 5A, the coating member 48 is covered with a resist 51 (S3). For the resist 51, a material which is normally used when a photolithography method is used, for example, a resin having a photosensitivity can be used.

Figure 5B:
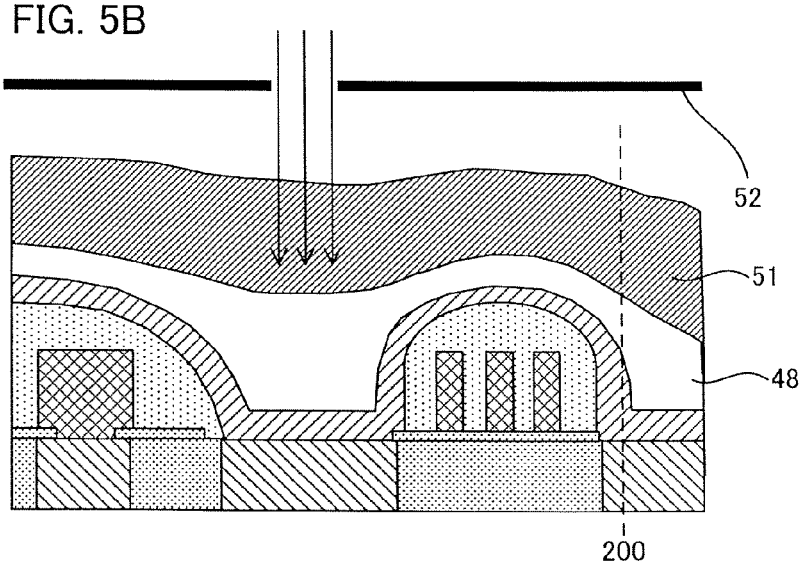
Figure 5C:
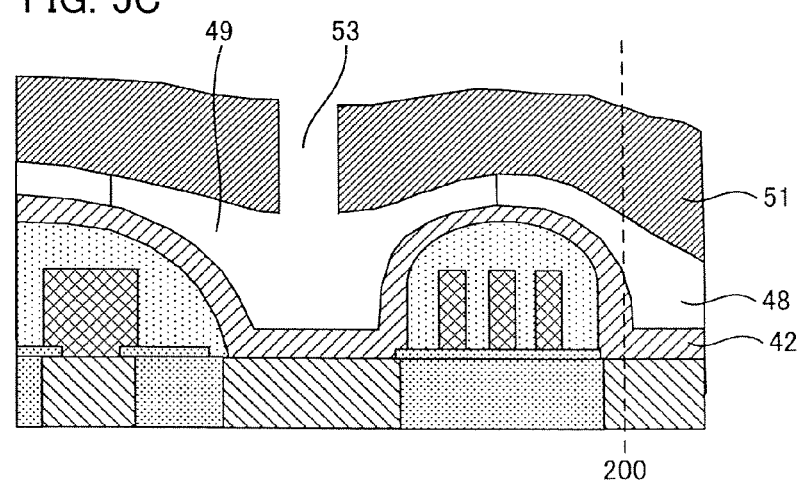

Next, as illustrated in FIGS. 5B and 5C, a penetrating hole 53 that penetrates the resist 51 is formed in the position that corresponds to the concave portion 46 of the substrate (S4), and the coating member within the concave portion 46 is removed (S5). The penetrating hole 53 formed in the resist 51 can be formed by the photolithography method.

More specifically, when the resist 51 is a positive type, as illustrated in FIG. 5B, the portion that is to be the penetrating hole 53 is irradiated using a mask 52 in a predetermined pattern. The penetrating hole 53 is formed by dissolving the irradiated portion of the resist 51 with a developing solution. An alkaline solution can be used for the developing solution. When the resist 51 is a negative type, the resist other than the portion that is to be the penetrating hole 53 can be irradiated. In this case, the penetrating hole is formed by dissolving the unexposed portion of the resist 51 with the developing solution. In other words, the resist 51 is irradiated in the predetermined pattern so as to enable the removal of the portion that is to be the penetrating hole 53 after S3 for covering the coating member 48 with the resist 51 by the photolithography method.

The developing solution is preferably a solution that dissolves even the coating member 48. By using this developing solution, S4 for forming the penetrating hole 53 that penetrates the resist 51 and S5 for removing the coating member 48 can be performed simultaneously.

In S5, even a portion of the coating member 48 with a thin thickness around the concave portion 46 of the substrate is preferably removed by adjusting the developing time by the developing solution. In this way, an open space with the predetermined shape is formed in the concave portion 46 of the substrate. This open space is surrounded by the substrate and the resist 51 except for the penetrating hole 53.

As will be described hereinafter in more detail, the diameter of the penetrating hole 53 formed in the resist 51 is preferably smaller than the diameter of the concave portion 46 of the substrate.

Next, a metal 43 is filled into a portion 49 where the coating member has been removed (S6). This metal 43 can be formed by a plating method. To form this metal 43, it is preferred to use a wet plating method, particularly an electroplating method. In the thin film magnetic head of the present embodiment, the metal 43 corresponds to the second plated part of the auxiliary pole part 22. The metal 43 formed in S6 is referred to as the second plated part hereinafter.

When using the electroplating method, a plating solution is filled through the penetrating hole 53 of the resist 51 into the portion 49 where the coating member 48 has been removed. The plating solution is filled tightly into the intricate open space 49, and therefore, the second plated part 43 can be certainly formed in the concave portion of the substrate.

Further, when using the plating method, it is preferred to form another metal layer 42 at least on the surface of the concave portion 46 prior to applying the coating member 48 to the substrate. This metal layer 42 in the present embodiment corresponds to the first plated part and can be used as an electrode at the time of metal deposition.

Figure 6A:
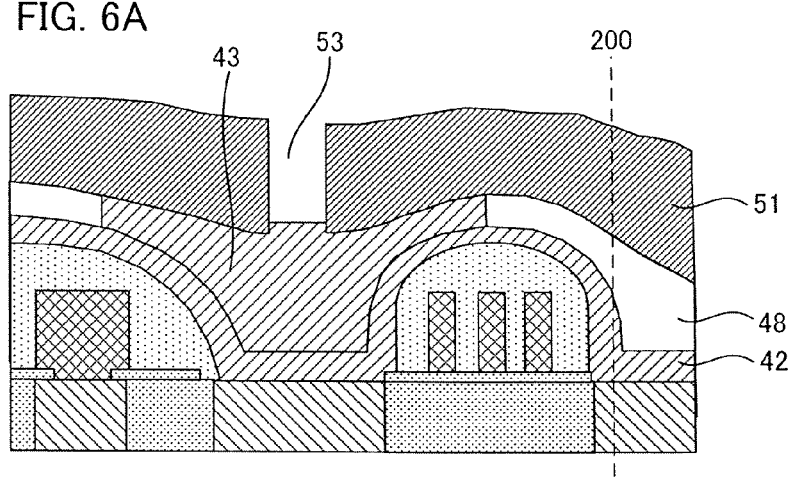
FIGS. 6A through FIG. 6C are process drawings illustrating processes that follow FIG. 5C.
Figure 6B:
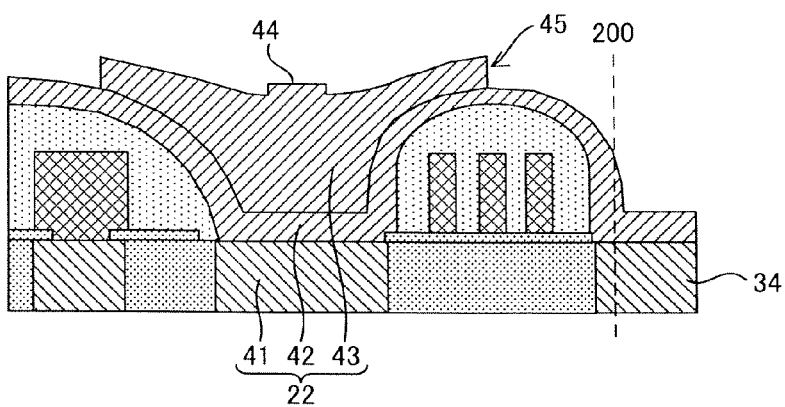

As illustrated in FIG. 6A, when the surface of the second plated part 43 substantially reaches a bottom end part of the penetrating hole 53, the metal deposition by the electroplating method is preferably finished. Accordingly, the surface of the second plated part 43 can mostly be a smooth shape. After the second plated part 43 is formed, the resist 51 is removed as illustrated in FIG. 6B.

As described above, the diameter of the penetrating hole 53 formed in the resist 51 is preferably smaller than the diameter of the concave portion 46 formed on the substrate. Accordingly, the resist 51 covers the upper side of the concave portion except for the penetrating hole 53. As a result, increasing of the film thickness of the second plated part 43 that is deposited by the plating method can be suppressed.

As described above, the open space 49 where the coating member 48 has been removed substantially determines the shape of the second plated part 43. As described above, the coating member 48 to be applied is a liquid form, and therefore, the surface becomes mostly flat and the film thickness around the concave portion 46 is small. As a result, the second plated part 43 with a mostly flat surface and a small height difference 45 of the edge part can be formed.

Figure 6C:
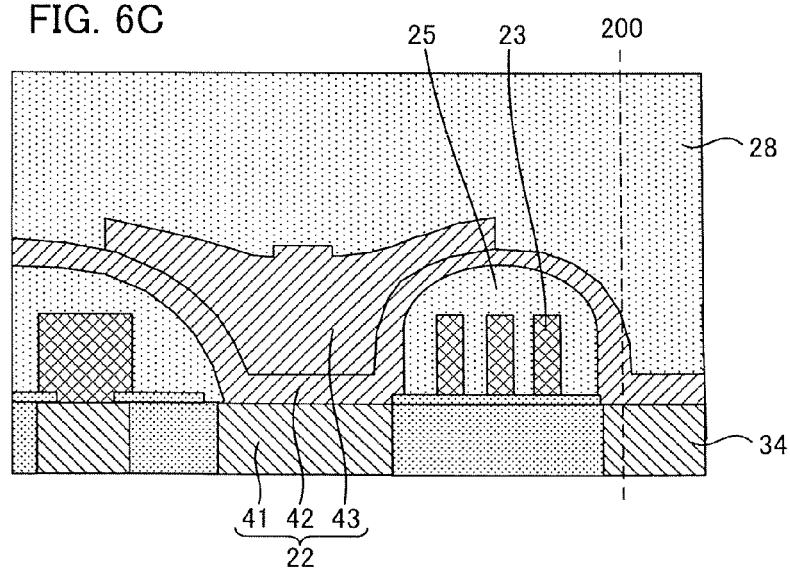

In the present embodiment, an insulating layer 28 is formed on the substrate as well as on the second plated part 43 formed on the substrate as illustrated in FIG. 6C. As described above, because the height difference 45 formed in the second plated part 43 on the substrate is small, the risk for causing problems such as a crack, void, heterogenous phase, and the like, in the insulating layer 28 can be reduced.

Further, in the present method, there is no need to polish the second plated part before forming the insulating layer 28. Therefore, damaging a structural object provided on the surface of the substrate or within the substrate, for example, the coil part 23, can be prevented.

A stack obtained in the manner described above is cut and/or polished to expose the air bearing surface 200. Accordingly, the magnetic head described above is completed.

At S1 through S6 described above, a method of forming a metal in the concave portion 46 positioned in the center of the coil part 23 was described. The method of the present invention can be applied to a substrate in general having a concave portion in place of this embodiment. The substrate may be configured with either the lamination films illustrated in FIGS. 4A and 4B, an arbitrary structure, or a configuration composed of only an insulating layer.

In the thin film magnetic head described above, the film thickness of the first plated part 42 is small. However, the thickness of the portion of the auxiliary pole part 22 that penetrates the center of the coil part 23 is enlarged by the second plated part 43. In this way, the high-frequency characteristics of the thin film magnetic head can be improved.

As described above, when forming the second plated part 43, it is preferable that deposition of the metal be finished when the metal substantially reaches the bottom end part of the penetrating hole 53. However, it is difficult to make the surface of the second plated part 43 completely flat, and a minute convex portion 44 or concave portion may be formed on the surface. Further, a minute height difference 45 is formed on an edge part of the second plated part 43, and this height difference 45 is sufficiently small compared to the depth of the concave portion 46 of the substrate.

Figure 7A:
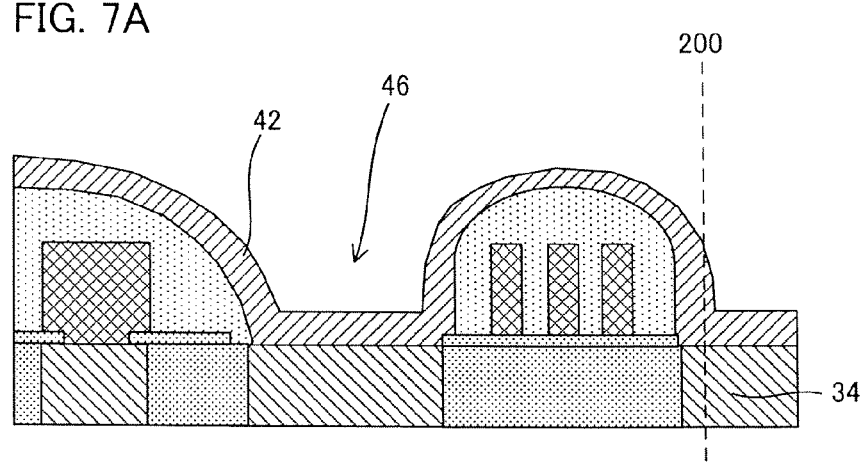
FIGS. 7A through 7C are process drawings describing a method that relates to a second embodiment of the present invention.
Figure 7B:
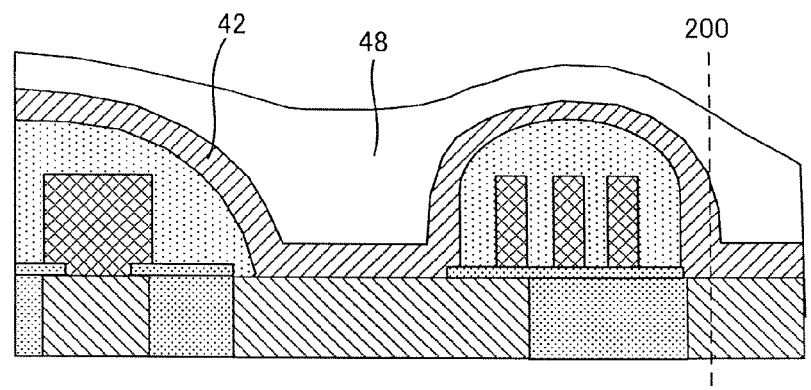
Figure 7C:
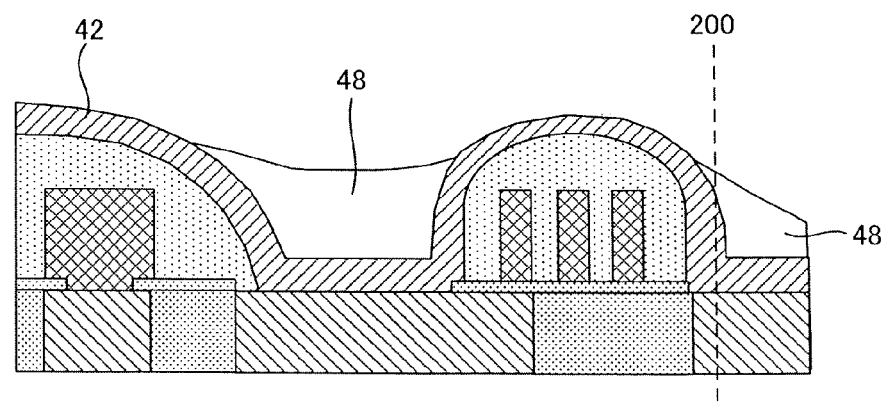
Figure 8:
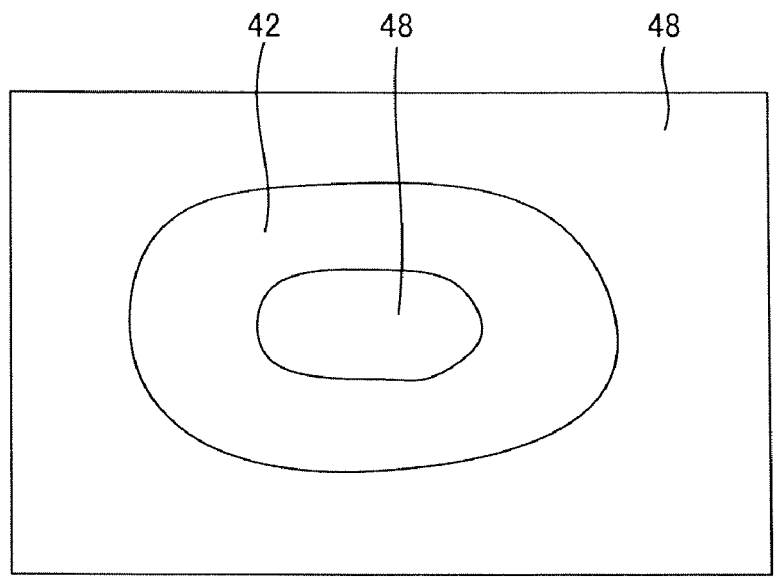
FIG. 8 is a top view of a lamination film illustrated in FIG. 7C.

Next, a description regarding a method of forming metal in a concave portion in a second embodiment is given with reference to FIGS. 7A through 7C, FIG. 8, FIGS. 9A through 9C, and FIGS. 10A and 10B. First, as is the case in the first embodiment, a substrate having a concave portion is prepared (see FIG. 7A). Here, the substrate is the same as that illustrated in FIG. 4B, and a first plated part 42 is formed on a surface thereof. Next, as illustrated in FIG. 7B, a liquid coating member 48 is applied on the substrate so that a concave portion 46 is filled with the coating member 48.

Next, the surface of the substrate (here, the first plated part 42) is exposed (see FIG. 7C and FIG. 8) in a manner of surrounding the concave portion 46 by partially removing the coating member 48 at least around the concave portion 46 prior to covering the coating member 48 with a resist. The coating member 48 is preferably removed by ashing. Specifically, the coating member 48 is reacted with plasma or the like to dissolve and remove the coating member 48 in a gaseous phase.

For example, a plasmatized oxygen gas can be used as a plasma utilized for ashing. In this case, the coating member 48 is preferably an organic matter. A carbon molecule that configures the organic matter is oxidized by the plasma and the organic matter as the coating member 48 can be partially removed.

As described above, the coating member 48 is preferably a material that is partially removable by ashing. Furthermore, as is the case in the first embodiment, the coating member 48 is preferably a viscous liquid that is can be applied by spin coating and a material having solubility in an alkaline solution. For example, PMGI, polymer metal alkoxide resin, or PHS can be used for such material.

The thickness of the coating member 48 becomes extremely small by ashing in the vicinity of a portion where the surface of the substrate is exposed. As a result, the height difference of the edge part of a metal to be formed thereafter can be extremely small as described in detail below.

Figure 9A:
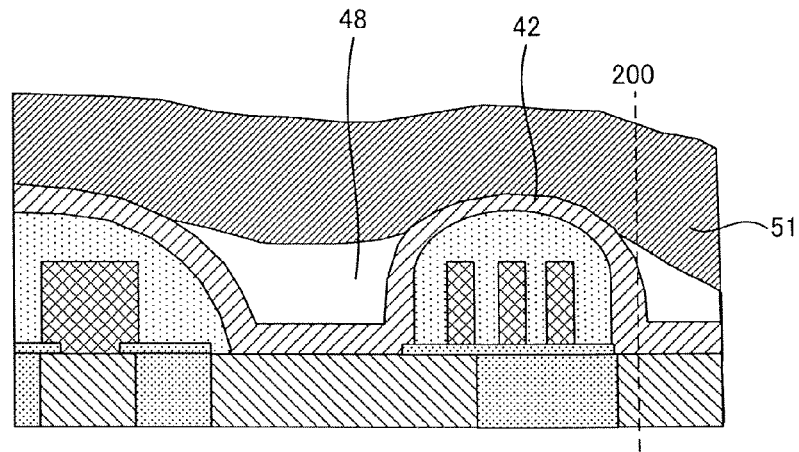
FIGS. 9A through 9C are process drawings illustrating processes that follow FIG. 7C.

Next, as is the case in the first embodiment, the coating member 48 is covered with a resist 51 (see FIG. 9A). At that time, the resist 51 contacts the surface of the substrate that is the surface of the first plated part 42 here in the vicinity of the concave portion 46. Accordingly, the coating member 48 within the concave portion is completely surrounded by the substrate and the resist 51.

Figure 9B:
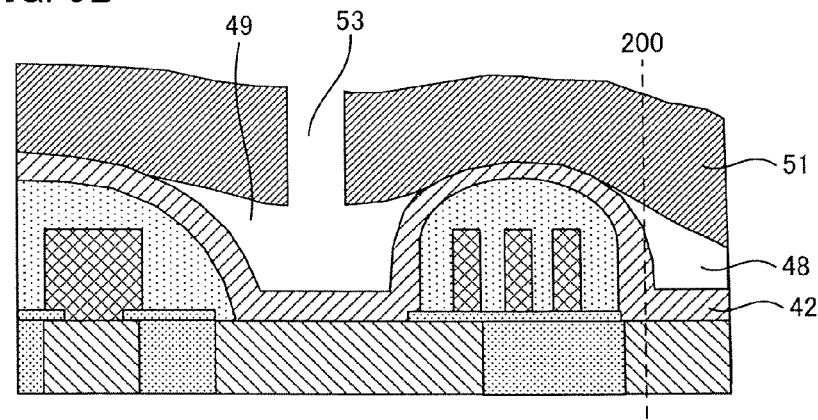

Next, as is the case in the first embodiment, a penetrating hole 53 that penetrates the resist 51 in the position of the concave portion 46 of the substrate is formed, and the coating member 48 within the concave portion 46 is removed (see FIG. 9B). The coating member 48, as is the case in the first embodiment, can be removed by an alkaline solution as the developing solution. The coating member 48 is surrounded by the substrate and the resist 51, and therefore, developing may be continued until the coating member 48 within the concave portion is completely dissolved.

Figure 9C:
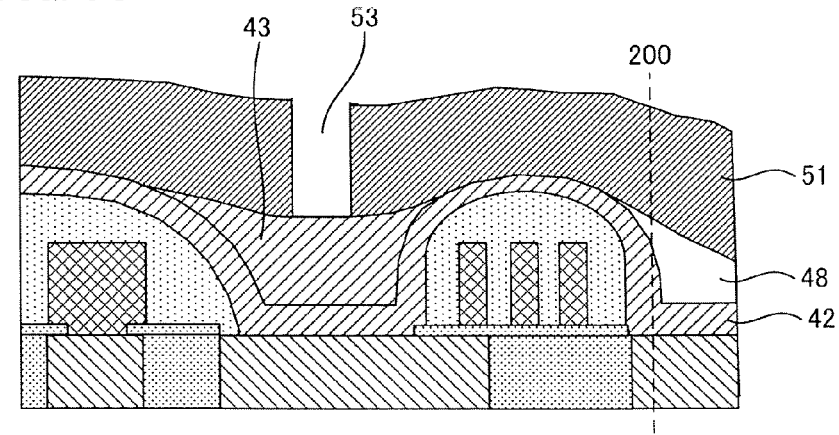

Next, as is the case in the first embodiment, a metal is filled into a portion 49 where the coating member is removed that is a second plated part 43 here (see FIG. 9C). In the method according to the second embodiment, the height difference of the peripheral edge of the second plated part 43 can be extremely small or the height difference can be eliminated.

Figure 10A:
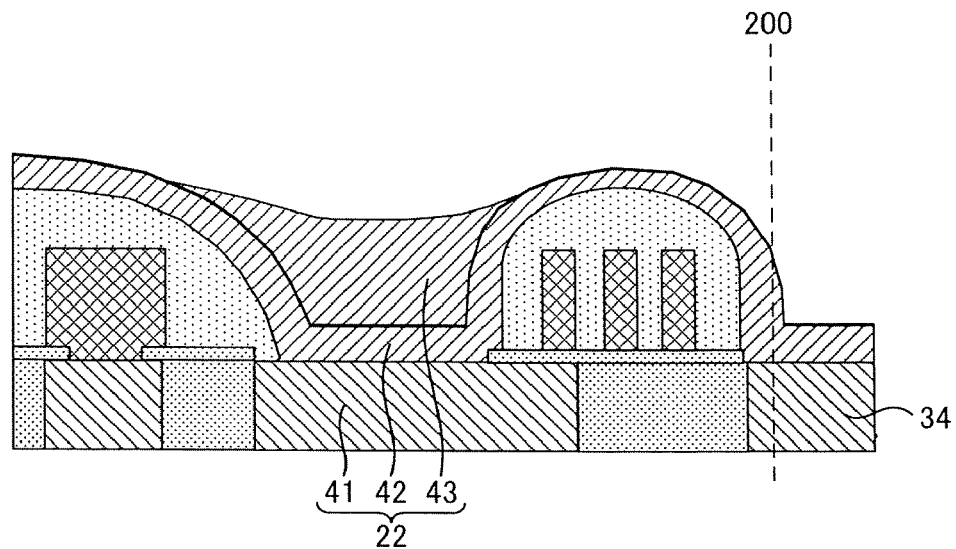
FIG. 10A and FIG. 10B are process drawings illustrating processes that follow FIG. 9C.
Figure 10B:
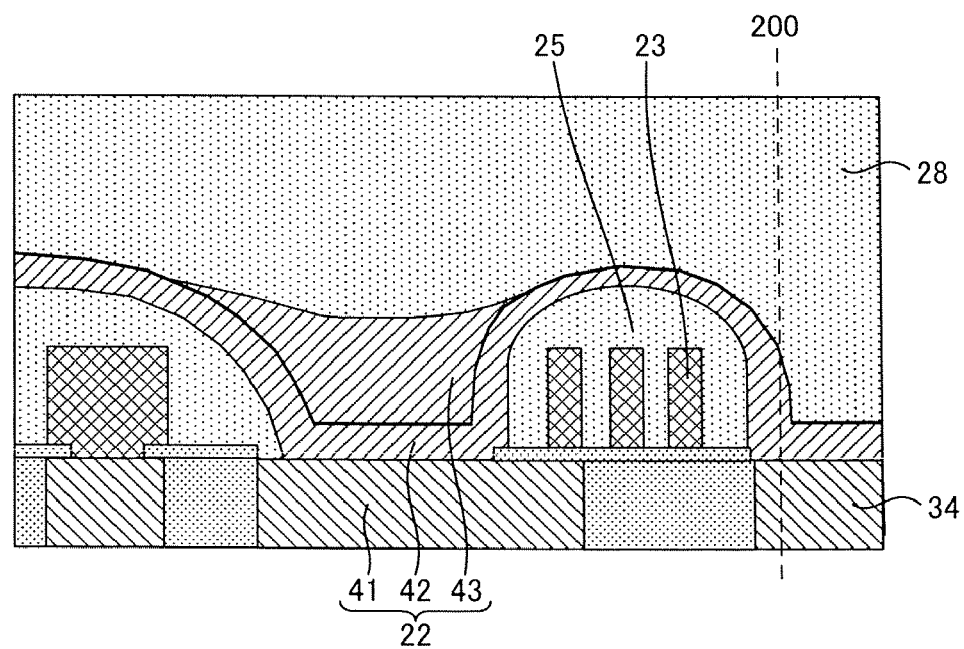

Next, the resist 51 is removed as illustrated in FIG. 10A. Subsequently, as illustrated in FIG. 10B, an insulating layer 28 is formed to cover the second plated part 43 as necessary. At that time, because the height difference of the second plated part 43 is extremely small, the risk for causing a problem in the insulating layer 28 such as a crack, void, heterogenous phase, and the like is reduced.

Figure 11:
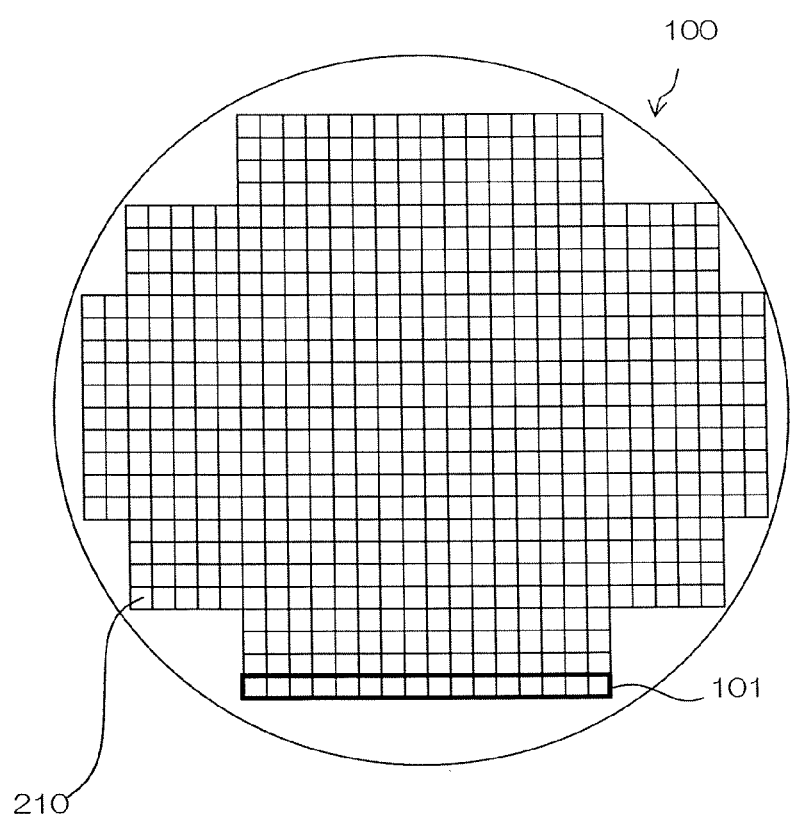
FIG. 11 is a plan view of a wafer that relates to manufacturing of a magnetoresistive element of the present invention.

Next, a description is given regarding a wafer that is used for manufacturing the above-described magnetic head 291. Referring to FIG. 11, at least the above-described magnetic heads are formed on a wafer 100. The wafer 100 is divided into a plurality of bars 101, which is an operational unit for performing a polishing process onto the air bearing surface. The bar 101 is further cut after the polishing process and is separated into sliders 210 each including the magnetic head. In the wafer 100, a cut margin (not shown) for cutting the wafer 100 into the bar 101 and the bar 101 into the slider 210 is disposed.

Figure 12:
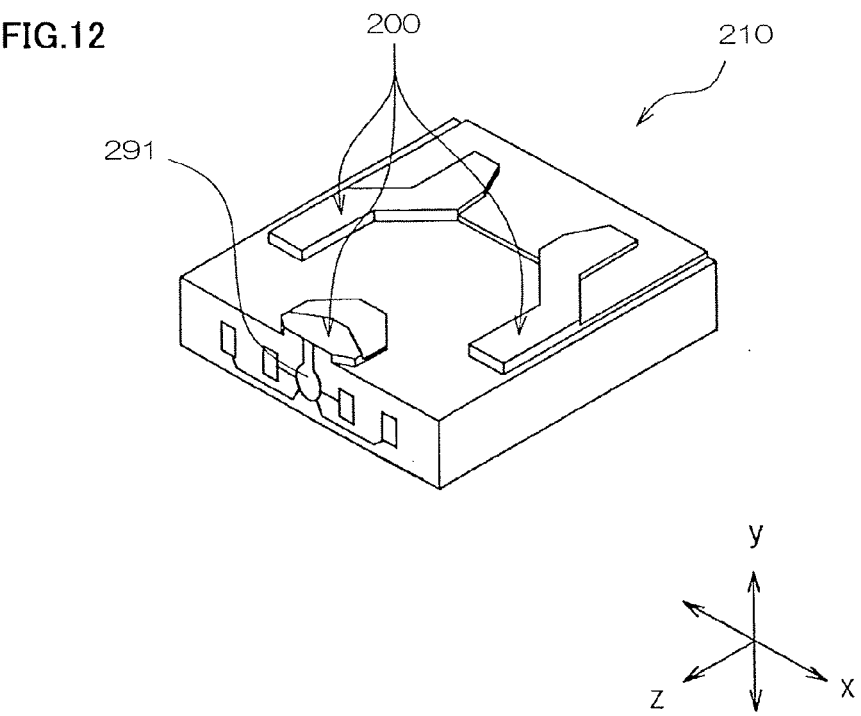
FIG. 12 is a perspective view of a slider of the present invention.

Referring to FIG. 12, the slider 210 has a substantially hexahedral shape, and one surface of the six outer surfaces is the air bearing surface 200 that opposes the recording medium such as, for example, a hard disk.

Figure 13:
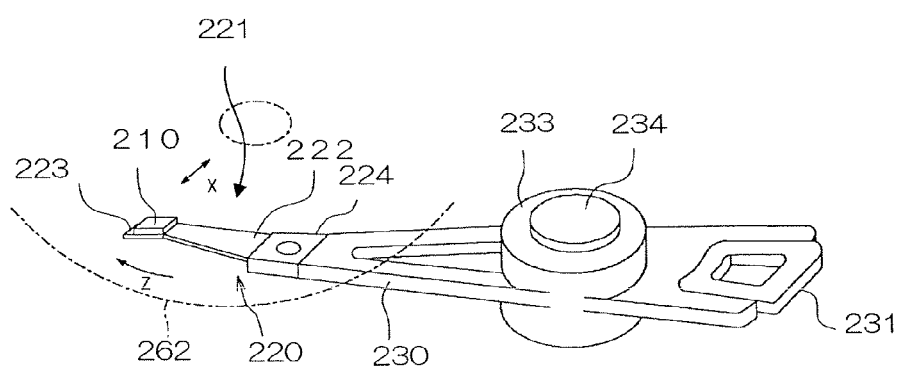
FIG. 13 is a perspective view of a head arm assembly including a head gimbal assembly in which a slider of the present invention is integrated.

Referring to FIG. 13, a head gimbal assembly 220 includes the slider 210 and a suspension 221 elastically supporting the slider 210. The suspension 221 includes a load beam 222, a flexure 223 and a base plate 224. The load beam 222 is formed of, for example, stainless steel in a plate spring shape.

The flexure 223 is arranged in one edge part of the load beam 222. The base plate 224 is arranged in the other edge part of the load beam 222. The flexure 223 is joined to the slider 210 to give the slider 210 suitable flexibility. At the part of the flexure 223 to which the slider 210 is attached, a gimbal part is disposed to maintain the slider 210 in an appropriate orientation.

The slider 210 opposes the hard disk 262, which is a disk-shaped recording medium that is rotatably driven. When the hard disk 262 rotates in the z direction of FIG. 13, air flow passing between the hard disk 262 and the slider 210 generates a downward lifting force in the y-direction to the slider 210. The slider 210 flies above the surface of the hard disk due to the lifting force. In the vicinity of the edge part of the slider 210 (edge part in bottom left of FIG. 12) on the air flow exit side, the magnetic head 291 is formed.

An assembly in which the head gimbal assembly 220 is mounted on an arm 230 is referred to as a head arm assembly. The arm 230 moves the slider 210 in a track crossing direction x of a hard disk 262. One edge of the arm 230 is attached to the base plate 224. To the other edge of the arm 230, a coil 231 that forms one part of a voice coil motor is attached. A bearing part 233 is disposed in the middle part of the arm 230. The arm 230 is rotatably supported by a shaft 234 attached to the bearing part 233. The arm 230 and the voice coil motor for driving the arm 230 configure an actuator.

Figure 14:
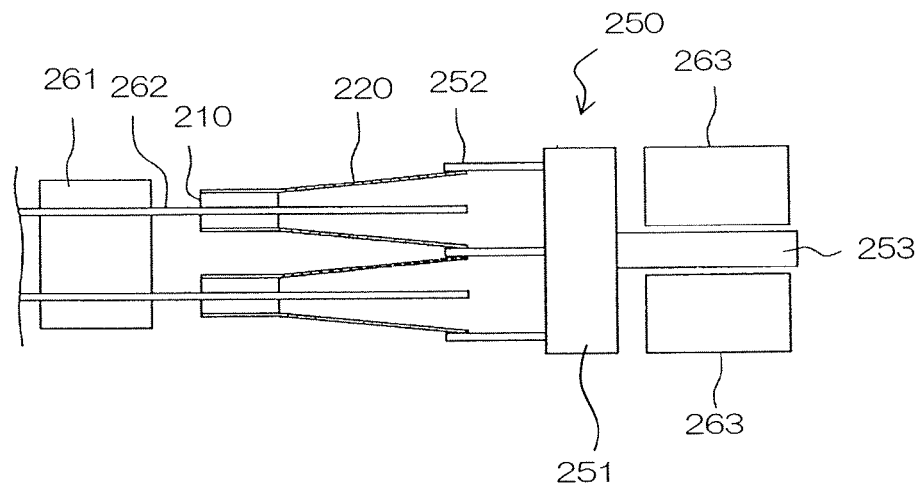
FIG. 14 is a side view of the head arm assembly with the slider of the present invention is integrated.
Figure 15:
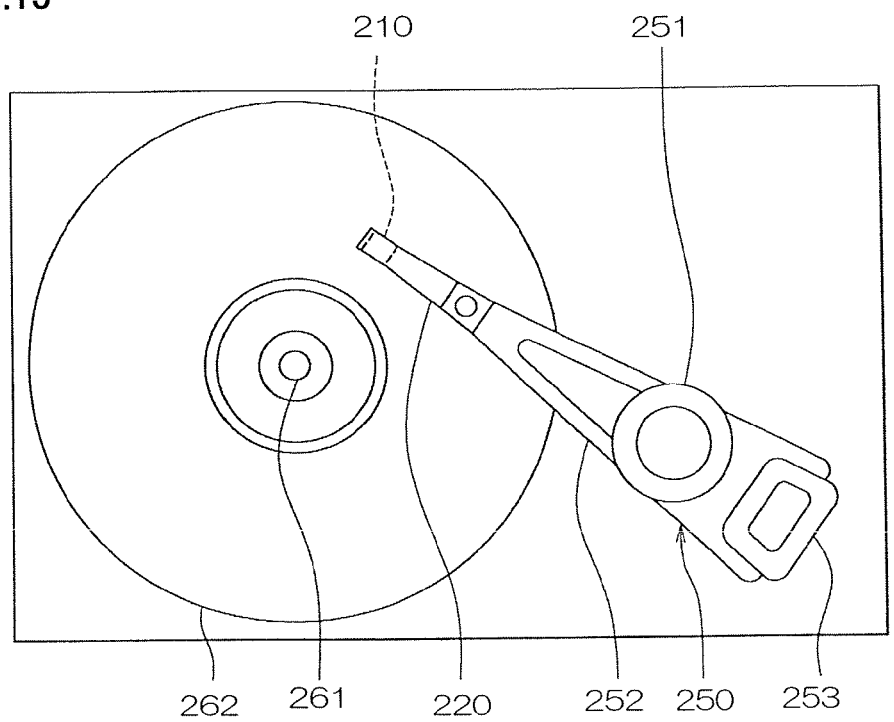
FIG. 15 is a plan view of a hard disk device with the slider of the present invention is integrated.

Next, referring to FIGS. 14 and 15, the description is given regarding a head stack assembly in which the above-described slider 210 is integrated, and the hard disk device. The head stack assembly is an assembly in which the head gimbal assembly 220 is attached to each arm 230 of a carriage 251 including a plurality of the arms 230. FIG. 14 is a side view of the head stack assembly. The head stack assembly as a positioning device 250 includes the carriage 251 including the plurality of arms 230. On each of the arms 230, the head gimbal assembly 220 is attached such that the head gimbal assemblies 220 align mutually at an interval in the vertical direction. On the side of the carriage 251, which is the opposite side to the arm 230, a coil 231 is mounted to be a part of the voice coil motor. The voice coil motor includes permanent magnets 263 that sandwich the coil 231 and oppose each other.

Referring to FIG. 15, the head stack assembly 250 is integrated in the hard disk device. The hard disk device includes multiple hard disks 262 attached to a spindle motor 261. For each of the hard disks 262, the two sliders 210 are arranged in a manner of sandwiching the hard disk 262 and opposing each other. The head stack assembly 250 except for the slider 210 and the actuator position the slider 210 with respect to the hard disk 262 in correspondence with the positioning device as well as supports the slider 210. The slider 210 is moved in the track width direction of the hard disk 262 by the actuator, and is positioned with respect to the hard disk 262. The magnetic head 291 included in the slider 210 records information to the hard disk 262 with the writing element, and reproduces information recorded on the hard disk 262 with the reading element.

While preferred embodiments of the present invention have been shown and described in detail, it is to be understood that variety of changes and modifications may be made without departing from the spirit of scope of the following claims or its scope.

What is claimed is:

1. A method of forming a metal in a concave portion of a substrate, comprising:

a step of preparing a substrate having a concave portion;

a step of applying a liquid coating member on the substrate and filling in and solidifying the concave portion with the coating member;

a step of covering the coating member with a resist;

a step of forming a penetrating hole that penetrates the resist in a position of the concave portion of the substrate;

a step of removing the coating member within the concave portion; and a step of filling a metal into a portion where the coating member has been removed.

2. The method according to claim 1, wherein
a plating solution is poured into the concave portion through the penetrating hole and the metal is formed by a wet plating method in the portion where the coating member has been removed.

3. The method according to claim 2, wherein
deposition of the metal is finished when a surface of the metal substantially reaches a bottom end part of the penetrating hole.

4. The method according to claim 2, wherein
another metal layer is formed at least on a surface of the concave portion prior to applying the coating member on the substrate.

5. The method according to claim 1, wherein
the diameter of the penetrating hole is smaller than the diameter of the concave portion.

6. The method according to claim 1, wherein
the resist is irradiated in a predetermined pattern to enable removal of a portion corresponding to the resulting penetrating hole after the step of covering the coating member with the resist, and the step of forming the penetrating hole and the step of removing the coating member are simultaneously performed by using a developing solution that dissolves the coating member.

7. The method according to claim 1, wherein
the coating member is applied on the substrate by spin coating.

8. The method according to claim 7, wherein
the coating member is applied on the substrate divided into several times.

9. The method according to claim 1, wherein
prior to the step of covering the coating member with the resist, the coating member at least around the concave portion is partially removed to expose a surface of the substrate surrounding the concave portion.

10. The method according to claim 9, wherein
the coating member is partially removed by ashing.

11. The manufacturing method according claim 1, wherein
the coating member is polymethylglutarimide, polymer metal alkoxide resin, or polyhydroxystyrene.

12. A method of manufacturing a magnetic head, comprising:

a step of preparing a lamination film including;
 a main pole part that faces an air bearing surface opposing a recording medium and that has a ferromagnetic layer extending farther from the air bearing surface,
 a coil part that is provided above the main pole part, and
 a coil insulating layer that covers the coil part and that has an aperture in the center of the coil part;

a step of forming a first plated part on the coil insulating layer, the first plated part being formed along the coil insulating layer and having a concave portion in a position of the aperture;

a step of applying a liquid coating member onto the first plated part and filling in and solidifying the concave portion with the liquid coating member;

a step of covering the coating member with a resist;

a step of forming a penetrating hole that penetrates the resist in a position of the concave portion of the first plated part;

a step of removing the coating member within the concave portion; and a step of forming a second plated part by filling a metal in a portion where the coating member has been removed.

13. The manufacturing method of the magnetic head according to claim 12, wherein
a plating solution is poured into the concave portion through the penetrating hole and the second plated part is formed by a wet plating method in the portion where the coating member has been removed.

14. The manufacturing method of the magnetic head according to claim 12, wherein
the resist is irradiated in a predetermined pattern to enable removal of a portion corresponding to the resulting penetrating hole after the step of covering the coating member with the resist, and the step of forming the penetrating hole and the step of removing the coating member are simultaneously performed by using a developing solution that dissolves the coating member.

15. The method according to claim 12, wherein
prior to the step of covering the coating member with the resist, the coating member at least around the concave portion is partially removed to expose a surface of the first plated part surrounding the concave portion.

16. A magnetic head, comprising:
a main pole part that faces an air bearing surface opposing a recording medium and that has a ferromagnetic layer extending farther from the air bearing surface;
a coil part that is provided above the main pole part;
a coil insulating layer that covers the coil part and that has an aperture in the center of the coil part; and
an auxiliary pole part that faces the air bearing surface, that extends farther from the air bearing surface above the coil insulating layer, and that penetrates the center of the coil part and couples with the main pole part, wherein
the auxiliary pole part includes,
 a first plated part that is formed along the coil insulating layer and has a concave portion in the position of the aperture, and
 a second plated part that is formed in the concave portion of the first plated part and that makes an upper surface of the auxiliary pole part mostly flat.

17. The magnetic head according to claim 16, wherein
either a minute convex portion or concave portion with a smaller diameter than the diameter of the concave portion is included in the position of the concave portion of a surface of the second plated part.

18. The magnetic head according to claim 16, wherein
a minute height difference is formed at an edge part of the second plated part.

19. The magnetic head according to claim 16, wherein
the coil insulating layer is a nearly semicircular shape from a perspective of the center of the coil part in a radiation direction.

* * * * *